United States Patent

[11] 3,607,269

| | | |
|---|---|---|
| [72] | Inventor | Richard W. Young<br>Wellesley, Mass. |
| [21] | Appl. No. | 717,683 |
| [22] | Filed | Apr. 1, 1968 |
| [45] | Patented | Sept. 21, 1971 |
| [73] | Assignee | Polaroid Corporation<br>Cambridge, Mass. |

[54] IMAGE-RECEIVING ELEMENTS AND PHOTOGRAPHIC PROCESSES EMPLOYING SAME
25 Claims, 1 Drawing Fig.

[52] U.S. Cl. .................................................. 96/29,
96/76, 117/63, 117/86
[51] Int. Cl. .................................................. G03c 1/48,
G03c 5/34
[50] Field of Search .......................................... 96/29 R, 76
R; 117/86, 85

[56] References Cited
UNITED STATES PATENTS

| | | | |
|---|---|---|---|
| 2,774,667 | 12/1956 | Land et al. ..................... | 96/29 |
| 3,000,736 | 9/1961 | Karlson ......................... | 96/29 |
| 3,004,850 | 10/1961 | Dickinson et al. ............. | 96/29 |
| 3,345,165 | 10/1967 | Land ............................. | 96/29 |

Primary Examiner—William D. Martin
Assistant Examiner—Ralph Husack
Attorneys—Brown and Mikulka and Stanley H. Mervis ABSTRACT: Image receiving elements and diffusion processes employing such elements are disclosed, wherein the element comprises a support carrying a layer composed of at least two strata, including a first stratum which comprises regenerated cellulose containing a silver precipitating agent and a mercapto substituted compound, and a second stratum comprising a alkali hydrolyzable cellulose ester. Reagents initially located in a stratum of unhydrolyzed polymer are extracted from the unhydrolyzed polymer in a controlled manner during processing.

PATENTED SEP 21 1971 3,607,269
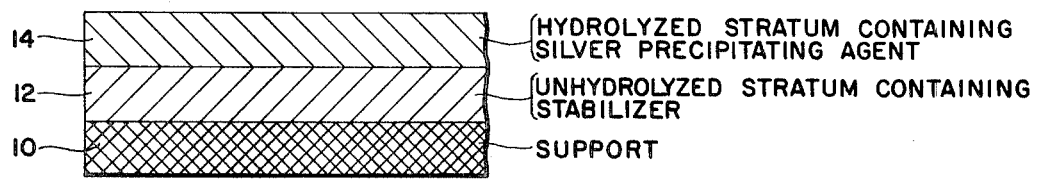
INVENTOR.
Richard W. Young
BY
Brown and Mikulka
and
Stanley H. Merwis
ATTORNEYS

IMAGE-RECEIVING ELEMENTS AND PHOTOGRAPHIC PROCESSES EMPLOYING SAME

This invention relates, in general, to diffusion transfer photography and, more particularly, to novel image-receiving elements and to silver diffusion transfer processes employing said novel image-receiving elements.

The copending application of Edwin H. Land, Ser. No. 675,472 filed Oct. 16, 1967, discloses and claims image-receiving elements which comprise an image-receiving stratum composed of a silver precipitating agent dispersed therein, the image-receiving stratum having been rendered "-permeable" to an alkaline processing composition by suitable modification prior to photographic processing but after the silver precipitating agent has been incorporated. In the most useful embodiments, the image-receiving stratum comprises regenerated cellulose obtained by alkaline hydrolysis of a cellulose ester, e.g., cellulose diacetate, and containing a silver precipitating agent. As disclosed in said Land application, only a depthwise portion of the cellulose ester stratum need be hydrolyzed to regenerated cellulose. The transferred silver is precipitated within the regenerated cellulose stratum thus obtained, even though an additional depthwise portion of the cellulose ester may be hydrolyzed to cellulose during the diffusion transfer process and additional silver precipitating nuclei thus made available.

This invention is concerned with an improvement in such image-receiving elements and in diffusion transfer processes employing such image-receiving elements. A primary object of this invention is to provide image-receiving elements which contain reagents which participate in the formation and/or improvement of the silver transfer image, said reagents being initially located in a stratum beneath the stratum in which the silver transfer image is formed.

A further object of this invention is to provide novel image-receiving elements which release reagents, such as toning agents and stabilizing agents, and particularly mercapto-substituted reagents, during diffusion transfer processing by extraction from a stratum underlying the image stratum.

Still another object of this invention is to provide novel image-receiving elements which contain reagents, such as toning agents and stabilizing agents, distributed in different strata in graduated concentrations whereby their effectiveness in silver transfer processes is increased.

Other objects of this invention are to provide novel diffusion transfer processes employing these novel image-receiving elements.

Other objects of the invention will in part be obvious and will in part appear hereinafter.

The invention accordingly comprises the process involving the several steps and the relation and order of one or more of such steps with respect to each of the others, and the products possessing the features, properties and the relation of elements which are exemplified in the following detailed disclosure, and the scope of the application of which will be indicated in the claims.

For a fuller understanding of the nature and objects of the invention, reference should be had to the following detailed description, taken in connection with the accompanying drawing wherein:

The FIGURE is an exaggerated cross-sectional view of an image-receiving element representative of this invention.

Diffusion transfer processes are now quite well known and their details need not be repeated here. In a silver transfer process, for example, a photoexposed silver halide material and a silver precipitating material are subjected to an aqueous alkaline solution comprising at least a silver halide developing agent and a silver halide solvent. The developing agent reduces exposed silver halide to silver and the solvent reacts with unreduced silver halide to form a complex silver salt that migrates to the silver precipitating material where it is precipitated or reduced to form a visible silver image.

As indicated above, the copending Land application discloses processes of forming image-receiving elements which involve incorporating a solid silver precipitating agent in an alkali-impermeable polymer or polymeric material to provide a dispersion wherein said silver precipitating agent constitutes the inner phase of said dispersion. The resulting dispersion usually is then coated as a layer on a support and subjected to appropriate hydrolysis treatment to convert at least a depthwise portion of said alkali-impermeable polymer to an alkali-permeable polymer. Silver-receptive elements thus may be prepared in a highly reproducible, economical and efficient manner, and the silver-receptive layer may be readily and advantageously modified according to the particular processing techniques ultimately employed to form silver transfer images therein. If the hydrolyzed polymer in which the silver transfer image is formed is water-insoluble, as in the case of regenerated cellulose obtained by hydrolysis of cellulose diacetate, the resulting transfer image may be subjected to washing without danger of physical damage, the washed print exhibiting high gloss and exceptional stability characteristics. These methods and the advantages obtained thereby are set forth in detail in said Land application.

As used herein and in said Land application, the term an "alkali-impermeable polymer" is intended to refer to a polymer (or polymeric coating) such as cellulose diacetate or other cellulose esters which are substantially impermeable to aqueous alkali, i.e., an aqueous alkaline processing composition, during the predetermined period within which a photographic process is to be performed. Similarly, and "alkali-permeable polymer" is one which is sufficiently permeable to an aqueous alkaline processing composition during such a predetermined period as to permit the silver precipitating agent to participate in the formation of the desired silver transfer. It will be understood that alkali ions or other components may in fact penetrate into the "alkali-impermeable" polymeric layer, but such penetration is ineffective to produce useful silver transfer density within predetermined processing period. In contrast, the conversion of the "alkali-impermeable" polymer into an "alkali-permeable" polymer is effective to permit the reagents which do penetrate or permeate into the alkali-permeable layer to form the desired silver transfer image within the predetermined processing period.

The alkali-impermeable polymer may be treated to render it alkali-permeable by any suitable chemical treatment which will not adversely affect the silver precipitating agent. Thus, by way of example, the alkali-impermeable polymer may be an alkali-impermeable cellulose ester, such as cellulose diacetate, and said polymer may be rendered alkali-permeable by alkaline hydrolysis. In certain instances, the alkali-impermeable polymer may be rendered alkali-permeable by acidic hydrolysis, as in the case of a polyvinyl alcohol acetal. One skilled in the art thus has a great deal of flexibility and may readily determine hydrolysis conditions appropriate for particular materials. The hydrolyzed polymer may or may not be water soluble or alkali soluble, it being necessary only that the hydrolyzed polymer be at least alkali-permeable so as to be processable with alkaline solutions and remain adhered to its support after image formation. The selection of suitable coating solvents or hydrolyzing reagents for any specific polymer or combination of polymer and materials dispersed therein is limited only by the obvious requirement that they have no adverse effects upon said materials or in the ultimate photographic application if not completely removed prior thereto. In general, it is preferred that the silver precipitating agent be substantially insoluble in the coating solvent and hydrolyzing reagent.

This invention is concerned with improvements in image-receiving of the type described in said Land application, and in diffusion transfer processes employing such elements, to improve the photographic and optical properties of the silver transfer image.

Silver transfer processes utilize a number of reagents in addition to the alkali, silver halide developing agent and silver halide solvent. In particular certain reagents may be present to modify the photographic and other properties of the silver transfer image. In particular, one may include reagents which are effective to modify the film speed, the tone of the silver transfer image, or the resistance of the image silver to attack under various conditions. Some reagents having desirable effects, for example, toning agents, may be capable of having additional and undesired effects (such as reducing transfer image density) if they are available at too high a concentration or too early in the process cycle. It has now been discovered that reagents may be initially located in the image-receiving element in a stratum of unhydrolyzed polymer, and extracted from that unhydrolyzed stratum in a controlled manner during processing so that their desirable properties are more effectively utilized. This improvement is particularly striking and valuable where it is desired to utilize toning agents or silver image stabilizing agents, and especially mercapto-substituted compounds, for these compounds frequently form relatively insoluble products with silver halide and could interfere with development of the exposed silver halide or transfer of undeveloped silver halide if made available at a point too early in the process cycle. Indeed, some reagents of this type are most effective for their intended purpose if used in relatively large quantities, but efforts to incorporate such large quantities in readily available locations, e.g., in the processing solution or in the image-receiving stratum itself, frequently result in a reduction in the density of the transfer image or in other undesirable consequences. The present invention makes it possible to utilize a wide variety of photographically useful reagents and to control or meter the rate at which they become available to participate in the process. Indeed, it is possible in accordance with this invention to delay the availability of a reagent until the transfer image has reached substantially full density; this ability is particularly valuable in the use of reagents intended to improve the stability of image silver, for many such reagents tend to reduce image density and/or quality if made available at an earlier stage of the photographic processing.

The novel image-receiving elements of this invention also make possible the in-process replenishment of a reagent which it is desired to have present only in limited quantity at any given stage of processing. In such embodiments a small quantity of the reagent is contained in the hydrolyzed stratum and larger quantities are disposed in the underlying unhydrolyzed stratum. The reagent in the unhydrolyzed stratum is available as silver complex is transferred thereto, and additional quantities of the reagent are diffused into the hydrolyzed stratum as processing proceeds.

The diffusible reagent in the unhydrolyzed stratum may be released as the polymer is hydrolyzed during photographic processing. It has been found, however, that it is possible in some situations to extract the reagent from the unhydrolyzed polymer without such hydrolysis. This is particularly true if the processing composition contains a component which swells the unhydrolyzed polymer to allow alkali to penetrate and extract the reagent from the unhydrolyzed polymer. As noted above, the image-receiving elements are prepared by hydrolyzing a depthwise portion of the hydrolyzable polymer layer prior to photographic processing. It appears that this hydrolysis treatment also may facilitate the desired subsequent extraction of the reagent from the unhydrolyzed portion. Thus it is not necessary, during photographic processing, to hydrolyze cellulose diacetate underlying a regenerated cellulose (hydrolyzed cellulose diacetate) stratum to extract an alkali-soluble reagent from the cellulose diacetate stratum.

Suitable alkali-impermeable, alkali-hydrolyzable polymers include cellulose esters, such as cellulose acetates, polyvinyl esters and acetals, such as polyvinyl acetal, etc. In the preferred embodiments, the alkali-hydrolyzable polymer is a cellulose ester and especially preferred is cellulose diacetate. The regenerated cellulose formed by the hydrolysis treatment possesses excellent physical characteristics for protecting the silver transfer image formed therein. Further description of the invention will refer to cellulose diacetate and regenerated cellulose for these reasons and for convenience.

The image-receiving elements of this invention may be prepared by various techniques. For example, a layer of cellulose diacetate containing an alkali-insoluble silver precipitating agent and an alkali-soluble toning agent is coated on a support. A depthwise portion of this layer is hydrolyzed to regenerated cellulose. The hydrolysis treatment is effective to remove a substantial portion, e.g., 50 to 75 percent, of the alkali-soluble toning agent from the hydrolyzed portions without removing the toning agent from the unhydrolyzed cellulose diacetate.

An image-receiving element of this general type is shown in the FIGURE wherein a support 10 carries a stratum 14 of a silver precipitating agent in a hydrolyzed or alkali-permeable polymer over a stratum 12 of residual unhydrolyzed or alkali-impermeable polymer containing a silver image stabilizing agent. It will be noted that these strata are not mutually exclusive or separate layers, but represent the depth-wise partial conversion of a single, continuous layer. This relationship will be true even though the silver-receptive layer is applied in a series of coatings to obtain the desired final thickness, since the use of a common coating solvent and matrix material will effectively avoid the formation of an interface between the successive coatings.

In another embodiment, a stratum of cellulose diacetate containing a silver precipitating agent, but no toning or stabilizing agent, is coated over a stratum of cellulose acetate containing a toning or stabilizing agent but no silver precipitating agent. The two strata of cellulose diacetate are effectively a single layer since the use of a common coating solvent will effectively avoid the formation of an interface between the successive coatings. Hydrolysis may be controlled to only the depth of the stratum containing the silver precipitating agent or it may be deep enough to also hydrolyze a portion, but not all, of the underlying cellulose diacetate stratum. Other techniques by which image-receiving elements within the scope of this invention may be prepared will be described below or will be readily apparent to one skilled in the art.

Examples of suitable silver precipitating agents include heavy metals such as iron, lead, zinc, nickel, cadmium, tin, chromium, copper, cobalt, particularly noble metals such as gold, silver platinum and palladium. Other useful silver precipitating agents include sulfides and selenides of heavy metals, particularly: sulfides of mercury, copper, aluminum, zinc, cadmium, cobalt, nickel, silver, lead, antimony, bismuth, cerium and magnesium; and selenides of lead, zinc, antimony and nickel. The function of such materials as silver precipitating agents in a silver transfer process is described, for example, in U.S. Pat. No. 2,774,667, issued on Dec. 18, 1956 in the names of Edwin H. Land et al. The silver precipitating agent may be vacuum deposited onto the alkali-hydrolyzable polymer in accordance with the procedures described in the aforementioned Land application, Serial No. 675,472. Another very useful method also described in said Land application is to form a solution of an alkali-impermeable polymer into which solution appropriate soluble reagents, e.g., silver nitrate and sodium sulfide, are added under agitation to form the desired solid silver precipitant in situ. Since the thus-formed silver precipitating agent is insoluble in the solvent in which the alkali-impermeable polymer is dissolved, very fine dispersions of the silver precipitating agent may be formed. The resulting dispersions may then be coated on an appropriate support and subjected to appropriate hydrolysis treatment.

The photosensitive stratum may contain one or more of the silver halides, of which silver chloride, silver bromide and silver iodide are examples, dispersed in a suitable protective colloid material, for example, gelatin, agar, albumen, casein, collodion, a cellulosic such as carboxymethyl cellulose, a vinyl polymer such as polyvinyl alcohol or a linear polyamide such as polyhexamethylene adipamide. Examples of specific formulations of conventional emulsions suitable for such use are described in T. T. Baker, *Photographic Emulsion Technique*, American Photographic Publishing Company, Boston, 1948, Chapter IV.

Suitable silver halide developing agents include: benzene derivatives having at least two hydroxyl and/or amino groups substituted in ortho or para position on the benzene nucleus, such as hydroquinone, amidol, metol, glycin, p-aminophenol and pyrogallol; and hydroxylamines, in particular, primary and secondary aliphatic and aromatic N-substituted or β-hydroxylamines which are soluble in aqueous alkali, including hydroxylamine, N-methyl hydroxylamine, N-ethyl hydroxylamine, and others described in U.S. Pat. No. 2,857,276, issued Oct. 21, 1958 to Edwin H. Land et al. and N-alkoxyalkyl-substituted hydroxylamines as described in U.S. Pat. No. 3,293,034, issued Dec. 20, 1966 to Milton Green et al. Suitable silver halide solvents include conventional fixing agents such as sodium thiosulfate, sodium thiocyanate, ammonium thiosulfate and others described in the aforementioned U.S. Pat. No. 2,543,181; and associations of cyclic imides and nitrogenous bases such as associations of barbiturates or uracils, and ammonia or amines, and other associations described in U.S. Pat. No. 2,857,274, issued Oct. 21, 1958 to Edwin H. Land et al.

The silver toning agent, silver image stabilizing agent, or other reagent whose availability is controlled in accordance with this invention may be selected from a wide variety of compounds. The most useful such compounds are mercapto-substituted, particularly mercapto-substituted heterocyclic compounds which form relatively insoluble products with silver halide. It will be understood that the selection of specific reagents is not a part of the present invention, and therefore such reagents need not be described in detail herein, although illustrative examples are given below. Furthermore, numerous examples of such reagents are described in the silver transfer art and those skilled in this art may readily select compounds which may be more usefully employed by following the teachings of this invention.

The following examples are intended to be illustrative of this invention and are not intended to be limiting.

EXAMPLE I

Cellulose diacetate was dissolved in a 1:3 mixture by weight of methanol and ethanol acetate containing a small amount of water. Cadmium acetate, lead acetate and sodium sulfide were added with agitation to this solution to form a colloidal dispersion of cadmium and lead sulfides in the cellulose diacetate solution. This dispersion was then coated over a layer of cellulose diacetate containing 1-phenyl-5-mercaptotetrazole on baryta paper, and the second cellulose diacetate layer subjected to hydrolysis with a methanol-water solution of sodium hydroxide to hydrolyze a depthwise portion of the cellulose diacetate layer to cellulose, leaving a stratum of unhydrolyzed cellulose diacetate over the stratum of cellulose diacetate containing the 1-phenyl-5-mercaptotetrazole. The thus-hydrolyzed sheet was washed to remove absorbed sodium hydroxide and dried. The thus-prepared image-receiving sheet was processed by spreading a layer approximately 0.0030 inch thick of a processing composition comprising:

| | |
|---|---|
| Potassium hydroxide | 156.5 g. |
| Uracil | 80 g. |
| Natrosol 250 (trade name of Hercules Corp. hydroxyethyl cellulose, high viscosity). | 50 g. |
| Zinc acetate | 15 g. |
| N,N-di-methoxyethyl-hydroxyl-amine | 50 cc. |

Water...... 1000 cc. between the image-receiving element and an exposed photosensitive silver halide emulsion. After an imbibition period of 30 seconds, the image-receiving element contained a silver transfer image of good density and contrast. This image was subject to accelerated aging by suspending the image over saturated sodium chloride solution for 1 hour at 85° C. in a closed vessel. The image prepared by this example showed less fading in this accelerated aging test than a similar image prepared without the 1-phenyl-5-mercaptotetrazole. It was also observed that the tone of the transfer image was not significantly changed as a consequence of the presence of 1-phenyl-5-mercaptotetrazole in the underlying cellulose diacetate stratum. It is believed that at least part of the 1-phenyl-5-mercaptotetrazole did not become associated with the silver image until after it had reached substantially full density.

EXAMPLE II

The procedure described in example I was repeated with the addition of 0.01 g. of thiazolidine thione per liter of the processing composition. The resulting silver transfer image exhibited a more neutral tone.

EXAMPLE III

The procedure described in the example II was repeated substituting N-methyl-mercapto-imidazole for the 1-phenyl-5-mercaptotetrazole. The resulting silver transfer image had good tone and exhibited good stability in the accelerated aging test described in example I.

EXAMPLE IV

The procedure described in example I was repeated using colloidal nickel sulfide as the silver precipitating agent. The resulting silver transfer image had a more neutral tone than the image obtained using the mixture of lead and cadmium sulfides, and also exhibited improved stability in the accelerated aging test. It was also found that the 1-phenyl-5-mercaptotetrazole could be present in a greater quantity without adversely affecting transfer image density.

EXAMPLE V

An image-receiving element was prepared by coating baryta paper with a layer of cellulose diacetate containing colloidal nickel sulfide, 2-acetamido-5-mercapto-1,3,4-thiadiazole (0.75 percent by weight of coating solution) and imidazolidine thione (0.5 percent by weight of the coating solution). This coating was hydrolyzed with a 50:50 methanol/water solution containing 30 g. of sodium hydroxide per 100 cc. and then washed. Examination of a cross section of the resulting sheet after drying showed that the stratum of regenerated cellulose was approximately 0.08 mil thick over a stratum approximately 0.16 mil thick of cellulose diacetate. Spectrophotometric analysis indicated that at least 50–75 percent of the 2-acetamido-5-mercapto-1,3,4-thiadiazole was removed from the hydrolyzed stratum. Analysis of the residual hydrolyzing solution showed that it had extracted a similar quantity of the imidazolidine thione. A substantially identical control image-receiving element was prepared by the same procedure, omitting the imidazolidine thione. The control image-receiving element was coated with a solution of gum arabic containing imidazolidine thione (0.5 percent by weight of coating solution). Use of the two image-receiving elements with the processing composition of example II showed that the element containing imidazolidine thione in the unhydrolyzed cellulose diacetate give silver transfer images of more neutral tone. The same neutral tone was not obtained by imbibing the imidazolidine thione into the regenerated cellulose or by increasing the concentration of the imidazolidine thione in the processing solution without incurring a reduction in the maximum density of the silver transfer image.

EXAMPLE VI

The procedure described in example I was repeated using silver nitrate and sodium sulfide to form a colloidal dispersion of silver sulfide in cellulose diacetate.

EXAMPLE VII

Baryta paper was coated with a layer 0.2 mil thick of a 3:1 mixture by weight of cellulose acetate and methyl vinyl ether/maleic anhydride copolymer (commercially available from General Aniline and Film under the trade name Gantrez AN-139). A 0.2-mil layer of cellulose diacetate containing nickel sulfide was then applied. Each of the aforesaid layers was applied using coating solutions which also contained 500 mg./liter of 2-acetamido-5-mercapto-1,3,4-thiadiazole, the nickel sulfide/cellulose diacetate coating solution also containing 50 mg./liter of thiazolidine thione. The cellulose diacetate layer was then subjected to alkaline hydrolysis as in the prior examples to give a layer of regenerated cellulose approximately 0.05 mil thick from which about 50–75 percent of the 2-acetamido-5-mercapto-thiadiazolidine thione was removed from the hydrolysis, leaving a stratum of unhydrolyzed cellulose diacetate approximately 0.05 to 0.1 mil thick. Diffusion transfer processing using the processing composition of example II resulted in the hydrolysis of part of the thin residual unhydrolyzed cellulose diacetate stratum. In addition, the methyl vinyl ether/maleic anhydride copolymer was effective to reduce the pH of the image layer, presumably by extracting alkali ions through the unhydrolyzed cellulose diacetate. The resulting silver transfer image exhibited higher gloss and greater stability to sulfur and sulfide attack in accelerated aging tests.

EXAMPLE VIII

The procedure described in example VII was repeated, except that the coating solution used to coat the layer of cellulose acetate and methyl vinyl ether/maleic anhydride copolymer also contained 50 mg./liter of thiazolidine thione. It was found that this image-receiving element gave improved results when the diffusion transfer process was performed at 100° F.

It will be understood that transparent supports may be employed in lieu of paper supports where it is desired to have transparencies which may be viewed by transmitted light or by projection. It is also within the scope of this invention to use a translucent support, e.g., a cellulose acetate support which has been coated with a translucent layer of titanium dioxide. Use of a translucent support permits the transfer image to be viewed by reflected or transmitted light.

Application of a thin strip coat, e.g., of dimethyl hydantoin formaldehyde or gum arabic, to the surface of the hydrolyzed image-receiving layer has been found to be helpful in preventing or minimizing adhesion of the solidified layer of processing composition to the image-receiving element upon separation of the superposed elements. If desired, the strip coat may also serve as a carrier for a reagent, e.g., a toning agent; in that event, a portion of such reagent may also diffuse inwardly into the hydrolyzed layer.

It has been noted that the photographic processing solution is effective to extract alkali-soluble reagents from the unhydrolyzed polymer and diffuse them into the hydrolyzed stratum during photographic processing. It is also possible to effect a redistribution of such alkali-soluble reagents from the unhydrolyzed to the hydrolyzed stratum prior to photographic processing by briefly contacting the image-receiving element with a solution such as aqueous methanol, with or without an alkali also being present.

The use of mercapto-thiadiazoles, e.g., 2-acetamido-5-mercapto-1,3,4-thiadiazole, gives unexpectedly superior results in increasing the stability of silver transfer images to attack, and especially to attack by sulfur.

It will be noted that where the preimbibition hydrolysis is of only a portion of the image-receiving layer, the silver precipitating nuclei are present in both the hydrolyzed and unhydrolyzed portions of this layer. Examination of photomicrographs of cross sections of such partially hydrolyzed cellulose acetate receiving layers has shown that the transfer image silver is deposited only in the preimbibition hydrolyzed portion, even through a substantial portion of the originally unhydrolyzed cellulose acetate has be hydrolyzed by the secondary hydrolysis during imbibition and silver precipitating nuclei were thus made available deeper in the image-receiving layer.

Where the alkali-impermeable polymer is cellulose acetate, as in the preferred embodiments of this invention, it has been found that good results can be obtained where the cellulose acetate has been hydrolyzed to a depth of about 0.00002 to 0.00015 inch, the total thickness of the hydrolyzed and unhydrolyzed portions being about 0.00010 to 0.00050 inch, these thicknesses being measured after hydrolysis (and prior to diffusion transfer processing) since some shrinking of the original coated thickness will occur as a result of the hydrolysis and subsequent heat drying. In the most useful embodiments, the hydrolyzed portion is about 0.00004 to 0.00010 inch and the total thickness of the hydrolyzed and unhydrolyzed portions is about 0.00015 to 0.00030 inch. The total thickness prior to hydrolysis may be about 0.00015 to 0.00060 inch, and preferably about 0.00020 to inch.

As is well known in the art, silver precipitants are present in very low quantities, e.g., about 1 to $25\times10^{16}$ moles per square foot. Higher levels are usually less desirable as they may cause excessive silver deposition or undesirable background density in the highlight areas. Mixtures of silver precipitants may be used. In general, the reflection density to white light of the unprocessed but hydrolyzed image-receiving layer coated on baryta should be less than 0.05 as compared with the uncoated baryta paper. The image-receiving layer thus may be described as substantially colorless and substantially transparent insofar as the presence of the nuclei is concerned. In certain instances it may be desirable to incorporate very small quantities of a blue or purple dye into the cellulose acetate coating solution, e.g., 0.5 to 5 cc. of a 1 percent solution of the dye per liter of coating solution, to act as a yellow filter to neutralize any background color imparted by diffusion transfer processing. Examples of dyes which may be used for this purpose include methylene blue, Direct Blue 70, methyl violet, Benzoform Brilliant Blue, etc.

As noted above, where the hydrolyzed polymer exhibits an adhesive tendency towards the solidified layer of processing fluid, e.g., as may occur where the surface of the image-receiving element is converted to cellulose and the processing fluid contains a film-forming polymer such as sodium carboxymethyl cellulose or hydroxyethyl cellulose, it may be desirable to coat the hydrolyzed surface with a suitable stripping layer to facilitate separation of the image-receiving element from the layer of processing fluid. Materials suitable for providing a stripping layer are well known in the art, and are exemplified by materials such as cellulose acetate hydrogen phthalate as well as others mentioned above. It will be appreciated, however, that in some instances it may be desirable to have the solidified layer of processing fluid preferentially adhere to the surface of such an image-receiving layer, in which event such a stripping layer should be omitted.

Additive color images may be formed by forming the silver transfer image in an image-receiving element formed in accordance with this invention, said image being in registered relationship with an additive color screen. In such embodiments, the additive color screen is preferably positioned between a transparent support and said silver-receptive stratum, exposure of the silver halide emulsion being effected through said screen.

It is also contemplated to utilize the techniques of this invention in high covering power transfer processes of the type disclosed in U. S. Pat. No. 2,861,885 issued Nov. 25, 1958 to Edwin H. Land, wherein the positive transfer image may be maintained in superposed relationship with the developed silver halide layer and viewed as a positive image.

It is also contemplated that the silver halide emulsion may be coated over the image-receptive stratum, the silver halide emulsion being removable after processing, as by provision of a suitable stripping layer or by employment of a silver halide emulsion which may be readily washed off after processing, e.g., a silver halide emulsion wherein the binder is cellulose acetate hydrogen phthalate. Alternatively, a pigmented layer, e.g., titanium dioxide in gelatin or a suitable plastic, may be positioned between the silver halide emulsion and the silver-receptive stratum coated on a transparent base, and the silver transfer image viewed through the transparent base against the pigmented layer, the pigmented layer masking out the image in the developed silver halide emulsion layer.

Since certain changes may be made in the above products and processes without departing from the scope of the invention herein involved, it is intended that all matter contained in the above description or shown in the accompanying drawing shall be interpreted as illustrative and not in a limiting sense.

What is claimed is:

1. An image-receiving element for use in a silver diffusion transfer process, said element comprising a support carrying a layer composed of at least two strata, said strata including a first stratum comprising regenerated cellulose containing a silver precipitating agent, and a second stratum comprising an alkali hydrolyzable cellulose ester, said stratum of cellulose ester being nearer said support and containing a mercapto-substituted compound in a quantity effective to improve the photographic properties of a silver transfer image formed in said stratum of regenerated cellulose.

2. An image-receiving element as defined in claim 1, wherein said second stratum comprising said cellulose ester also contains a silver precipitating agent.

3. An image-receiving element as defined in claim 1, wherein said mercapto-substituted compound improves the stability of said silver transfer image.

4. An image-receiving element as defined in claim 1, wherein said mercapto-substituted compound improves the tone of said silver transfer image.

5. An image-receiving element as defined in claim 1, wherein said stratum of regenerated cellulose contains a smaller quantity per square foot of the same mercapto-substituted compound.

6. An image-receiving element as defined in claim 1, wherein said second stratum comprising said cellulose ester contains a first mercapto-substituted compound which improves the stability of said silver transfer image and a second mercapto-substituted compound which improves the tone of said silver transfer image.

7. An image-receiving element as defined in claim 1, wherein said mercapto-substituted compound is 1-phenyl-5-mercaptotetrazole.

8. An image-receiving element as defined in claim 1, wherein said mercapto-substituted compound is imidazolidine thione.

9. An image-receiving element as defined in claim 1, wherein said silver precipitating agent comprises silver sulfide.

10. An image-receiving element as defined in claim 1, wherein said silver precipitating agent comprises nickel sulfide.

11. An image-receiving element as defined in claim 1, wherein said silver-precipitating agent comprises lead sulfide.

12. An image-receiving element as defined in claim 1, wherein said silver precipitating agent comprises colloidal gold.

13. An image-receiving element as defined in claim 1, wherein said layer includes a third stratum positioned between said first and second strata, said third stratum comprising said alkali-hydrolyzable cellulose ester and said silver precipitating agent.

14. An image-receiving element as defined in claim 1, wherein said hydrolyzable cellulose ester is cellulose diacetate.

15. The method of forming a silver transfer image comprising exposing a photosensitive silver halide emulsion, developing said exposed silver halide emulsion with an aqueous alkaline processing solution including a silver halide developing agent and a silver halide solvent, forming an imagewise distribution of a diffusible silver complex as a function of said development, transferring at least a portion of said imagewise distribution of diffusible silver complex to a superposed layer composed of at least two strata, said strata including a silver receptive stratum comprising regenerated cellulose containing a silver precipitating agent to form said silver transfer image, and a second stratum on the other side of said stratum from said silver halide emulsion and comprising an alkali-hydrolyzable cellulose ester containing a mercapto-substituted compound, at least a portion of said mercapto-substituted compound being diffused to said stratum of regenerated cellulose during the formation of said silver transfer image.

16. A method as defined in claim 15, wherein said stratum of cellulose ester also contains a silver precipitating agent.

17. A method as defined in claim 15, wherein said silver halide developing agent is an N,N-dialkyl substituted hydroxylamine and said silver halide solvent is a cyclic imide.

18. A method as defined in claim 15, wherein said layer includes a third stratum positioned between said first and said second strata, said third stratum comprising said alkali-hydrolyzable cellulose ester and said silver precipitating agent.

19. A method as defined in claim 15, wherein said hydrolyzable cellulose ester is cellulose diacetate.

20. An image-receiving element for use in a silver diffusion transfer process, said element comprising a support carrying a layer composed of at least two strata, said strata including a first stratum comprising an alkali-permeable polymer containing a silver precipitating agent, and a second stratum comprising a polymer which is hydrolyzable to said alkali-permeable polymer, said stratum of said hydrolyzable polymer being nearer said support and containing a diffusible reagent adapted to modify the photographic properties of a silver transfer image formed in said stratum of said alkali-permeable polymer, said hydrolyzable polymer being selected from the group consisting of hydrolyzable cellulose esters, polyvinyl esters and polyvinyl acetals.

21. An image-receiving element as defined in claim 20, wherein said reagent improves the stability of said silver transfer image.

22. An image-receiving element as defined in claim 20, wherein said reagent improves the tone of said silver transfer image.

23. An image-receiving element as defined in claim 20, wherein said stratum of alkali-permeable polymer contains a smaller quantity per square foot of said reagent.

24. An image-receiving element as defined in claim 18, wherein said stratum of hydrolyzable polymer contains a first compound which improves the stability of said silver transfer image and a second compound which improves the tone of said silver transfer image.

25. The method of forming a silver transfer image comprising exposing a photosensitive silver halide emulsion, developing said exposed silver halide emulsion with an aqueous alkaline processing solution including a silver halide developing agent and a silver halide solvent, forming an imagewise distribution of a diffusible silver complex as a function of said development, transferring at least a portion of said imagewise distribution of diffusible silver complex to a superposed layer composed of at least two strata, said strata including a first, silver receptive stratum comprising an alkali-permeable polymer containing a silver precipitating agent to form said silver transfer image, and a second stratum positioned on the opposite side of said first stratum from said silver halide emulsion, said second stratum comprising a polymer hydrolyzable to said alkali-permeable polymer and containing a reagent which participates in the formation or improvement of said silver transfer image, said hydrolyzable polymer being selected from the group consisting of hydrolyzable cellulose esters, polyvinyl esters and polyvinyl acetals, at least a portion of said reagent being diffused to said stratum of alkali-permeable polymer during the formation of said silver transfer image.

UNITED STATES PATENT OFFICE
CERTIFICATE OF CORRECTION

Patent No. 3,607,269                    Dated September 21, 1971

Inventor(s) Richard W. Young

It is certified that error appears in the above-identified patent and that said Letters Patent are hereby corrected as shown below:

IN THE ABSTRACT:

Line 7, "a" should be --an--.

IN THE SPECIFICATION:

Column 2, line 27, "and" should be --an--.

Column 5, line 71, "subject" should be --subjected--.

Column 7, line 74, "be" should be --been--.

Column 8, line 18, after "0.00020 to" insert --0.00030--.

Column 8, line 19, "25 x $10^{16}$" should be --25 x $10^{-6}$--.

IN THE CLAIMS:

Claim 24, line 1, "claim 18" should be --claim 20--.

Signed and sealed this 27th day of June 1972.

(SEAL)
Attest:

EDWARD M. FLETCHER, JR.                 ROBERT GOTTSCHALK
Attesting Officer                       Commissioner of Patents

Disclaimer 3,607,269.—*Richard W. Young*, Wellesley, Mass. IMAGE-RECEIVING ELEMENTS AND PHOTOGRAPHIC PROCESSES EMPLOYING SAME. Patent dated Sept. 21, 1971. Disclaimer filed July 5, 1984, by the assignee, *Polaroid Corp.*

Hereby enters this disclaimer to claims 1–25 of said patent.

[*Official Gazette October 2, 1984.*]